Patented Oct. 2, 1951

2,569,985

UNITED STATES PATENT OFFICE 2,569,985

THIOUREA-KETONE COMPLEXES

Lloyd C. Fetterly, Seattle, Wash., assignor to Shell Development Company, San Francisco, Calif., a corporation of Delaware No Drawing. Application February 16, 1948, Serial No. 8,748

6 Claims. (Cl. 260—552)

This invention is concerned with the separation of mixtures of organic compounds into preferred fractions. More particularly, it is directed to the extraction of certain fractions from mixtures of organic materials by means of preferential complex formation with thiourea.

The formation of complexes between thiourea and a limited number of organic materials has been reported in the literature. However, based upon the available information, the crystalline complexes previously formed give substantially no clue as to further types of complexes which could be prepared and, furthermore, do not indicate any practical utilization of this formation.

The separation of organic mixtures into desirable fractions is a simple matter if a mere segregation according to boiling point is desired, but in many cases it becomes necessary to employ other methods of fractionation if the mixtures contain materials having similar boiling points or if the mixtures contain a variety of structural configurations, etc.

It is an object of this invention to provide a method for the separation of certain types of polar compounds from their mixtures with other materials. It is another object of the present invention to produce novel crystalline complexes of thiourea with certain classes of polar organic materials. Other objects will become apparent during the following discussion.

Now, in accordance with this invention, it has been found that crystalline molecular complexes may be formed between thiourea and certain alkanones and alkenones as exemplified hereinafter.

Suitable ketones include methyl isobutyl ketone, methyl-sec-butyl ketone, methyl-tert-butyl ketone, ethylisoamyl ketone, ethylisopropyl ketone, di-isopropyl ketone, propyl-sec-butyl ketone, as well as their homologs and analogs.

Any of the above materials or mixtures thereof may be contacted with thiourea either in the pure state or in a diluted form. They may be in admixture with other polar compounds which are substantially inert toward thiourea, or they may be diluted with such materials as a straight chain hydrocarbon or a low molecular weight alcohol. If the mixture is viscous in character it is preferred that a diluent such as normal hexane be present so as to permit greater facility in handling. In most cases where the mixture is oleaginous it is preferred that the diluent be present at least in an amount approximately equal to that of the mixture to be treated. If the complex formation is to take place in the gaseous phase, the diluent which is present may be an inert gas such as nitrogen or hydrogen.

Thiourea may be in a form of a solid or a solution. The term "thiourea" as used throughout the specification and claims is meant to include the unmodified substance or salts thereof, such as the acetic acid salt or the hydrochloride. Preferably the solvent for thiourea is at least partially aqueous and is largely immiscible with the phase containing the organic compounds with which complex formation is maintained. Thus the thiourea solvent may be an aqueous alcohol, preferably containing an alcohol-to-water ratio of from 3:1 to 20:1. Aqueous alcoholic solvents having this character have been found to cause sharp fractionation of the mixtures.

The thiourea solution may be contacted with the organic compounds in any convenient apparatus such as a tower or vat. A continuous operation is desirable, especially one wherein a large amount of the reactants are present at any one time. It has been found that the complexes form with substantially greater rapidity under these conditions than if batch reactions are employed and furthermore, that the crystals of the complex are larger in size and thus are of a more readily filterable character. A system which has been found satisfactory for the purpose comprises a tower having inlets at the bottom both for the mixture and for the thiourea solution, the rate of flow of the materials being regulated so as to permit substantially complete complex formation to occur before the mixture passes out near the top of the tower.

The temperature at which the reaction is carried out will be largely a matter of convenience and selection. It has been found that many of the complexes of the character described readily form at ordinary temperatures. The reaction is slightly exothermic and thus at times cooling may be required. However, with proper provision for heat dissipation or with contact with cooling water, refrigerated systems are usually unnecessary.

It has been discovered that each specific complex has a maximum temperature beyond which complexes with thiourea will not form. This maximum critical temperature varies widely among individual species of the classes described above. Hence, it is possible to utilize this phenomenon in the separation of mixtures containing two or more polar compounds which are capable of forming complexes with thiourea. By regulating the temperature so that complexes are formed with a fraction of the mixture, separating the complexes so formed and subsequently lowering the temperature so as to promote the complex formation of other materials which may be present, it is possible to separate such a mixture into any number of desired fractions.

The time required for the formation of these crystalline complexes will vary within certain limits, dependent in part upon the temperature and the pH of the reaction mixture. Low temperatures appear to promote a rapid rate of complex formation. The rate is also increased by maintaining a pH of below about 9.5 and preferably from about 5.5 to 8.0. It may be necessary to adjust the pH periodically due to alkaline contamination of the system. This may be caused by the introduction of impurities or their creation by such factors as the decomposition of thiourea.

Following the formation of crystalline complexes, the reaction mixture may be conducted to a separating zone wherein the crystals are removed from the other components of reaction mixture. This may be effected by such means as a filtration apparatus or a centrifuge. Other means may be employed as well. The filtrate will consist of any liquid or dissolved organic materials which have not reacted with thiourea to form crystalline complexes and also any remaining thiourea, preferably in solution. It is also preferable, as indicated hereinabove, that the solution of thiourea be immiscible with the mixture of organic materials. Following separation from the crystalline complexes, the filtrate is allowed to separate into these two phases, after which the thiourea solution may be recycled to the complex formation zone for utilization in further treatments.

It is preferred that additional thiourea be added to the system during this recycling step so as to maintain a solution which is substantially saturated if such is desired. However, it has been noted that each species of reactive material requires a critical degree of saturation of the thiourea solution in order to permit complex formation. This phenomenon may be taken advantage of in the fractionation of mixtures containing more than one reactive substance. By controlling the concentration of the thiourea solution it is possible to permit complex formation with a particular substance while minimizing or even completely preventing the formation of complexes with other materials which would be normally reactive under more favorable conditions.

The crystalline complexes prepared in the above manner are readily decomposable. Facility of recovery of the initial reactants by decomposition of the complex characterizes the nature of the latter and differentiates it from true derivatives of thiourea. The exact constitution and configuration of the complexes have not been clearly determined. It has been ascertained that the complexes usually contain approximately one molecule of thiourea for each carbon atom in the organic compound. However, the method by which these two are bound together in the complex is unknown at the present but appears to be due to some form of hydrogen bonding.

The crystalline complexes may be utilized without further treatment such as in the formation of insecticides, fertilizers or pharmaceuticals but their principal advantage lies in the fact that they are preferentially formed to the exclusion of other fractions of a mixture and that they are easily decomposable so that the original organic material and thiourea may be readily recovered.

The complexes may be decomposed by the application of heat together with a solvent for thiourea; by contacting the complex with a solvent for the organic compound and heat; or by treatment with heat, steam or a hot dry gas such as nitrogen. By application of these conditions the complexes are decomposed and the component parts thereof readily separated. The following examples illustrate the process of the present invention and indicate specific complexes which are easily formed.

Example

A saturated aqueous solution of thiourea was contacted at 25° C. with each of the following compounds, 6 parts by weight of the solution being used for each part of the compound. The reaction mixture was shaken until a crystalline complex formed. If this complex was heated in the presence of water it could be decomposed to yield the original organic compound and a solution of thiourea.

Ketones:
- methyl isobutyl ketone
- diisopropyl ketone
- diethyl ketone
- methyl n-propyl ketone
- mesityl oxide

I claim as my invention:

1. As a new composition of matter, a crystalline complex of thiourea with an aliphatic ketone selected from the group consisting of methyl isobutyl ketone, diisopropyl ketone, diethyl ketone, methyl n-propyl ketone and mesityl oxide.

2. As a new composition of matter, a crystalline complex of thiourea with methyl isobutyl ketone.

3. As a new composition of matter a crystalline complex of thiourea with diethyl ketone.

4. As a new composition of matter a crystalline molecular complex of thiourea with mesityl oxide.

5. As a new composition of matter a crystalline complex of thiourea with diisopropyl ketone.

6. As a new composition of matter a crystalline complex of thiourea with methyl n-propyl ketone.

LLOYD C. FETTERLY.

REFERENCES CITED

The following references are of record in the file of this patent:

UNITED STATES PATENTS

| Number | Name | Date |
|---|---|---|
| 2,047,144 | Kharasch | July 7, 1936 |
| 2,499,820 | Fetterly | Mar. 7, 1950 |

OTHER REFERENCES

Nencki, "Ber. Deut. Chem.," vol. 7, (1874) pp. 779, 780.

Reynolds, "Jour. Chem. Soc.," (London) vol. 59 (Trans.) (1891) pp. 387–392.

Evans, "J. Prakt. Chem." (series 2) vol. 48 p. 506 (1893).

Atkins et al., "Jour. Chem. Soc." (London) vol. 101 (1912) pp. 1988–1991.

(Other references on following page)

OTHER REFERENCES

Goldschmidt et al., "Z. für Elektrochemie," vol. 22 (1916) pp. 339–349.

Taylor, "J. Chem. Soc." (London) vol. 111 (1917) pp. 650–657, 660–663.

Taylor, "Jour. Chem. Soc.," (London) vol. 111 (1917) pp. 657–660.

Taylor, "J. Chem. Soc.," (London) vol. 117 (1920) pp. 4–11.

Dixon et al., "J. Chem. Soc.," (London) vol. 117, (1920) pp. 720–728.

Singh et al., "Jour. Chem. Soc.," (London) vol. 119 (1921) pp. 210–211.

Chemical Abstracts, vol. 23 (1929) p. 5185.

Bougault et al., "Comptes Rendus Acad. Sci.," vol. 218 (1944) pp. 559–561.

McCosland, "J. Am. Chem. Soc.," vol. 68 (1946) p. 533.

T. O. M. Reel 143, pp. 2–6 deposited in Library of Congress, May 22, 1946 and sent to the Shell Oil Company for translation.

Angla, "Comptes Rendus Acad. Sci.," vol. 224, Feb. 10, 1947 pp. 402, 403, 404 and April 21, 1947 pp. 1166 and 1167.

Zimmerscheid et al., "Ind. and Eng. Chem.," vol. 42, July 1950, p. 1303 and 1304.